United States Patent [19]

Jackson

[11] 4,364,592
[45] Dec. 21, 1982

[54] MULTI-PURPOSE LOG HANDLING TOOL

[76] Inventor: Charles P. Jackson, 322 Thornridge Dr., Stamford, Conn. 06903

[21] Appl. No.: 245,964

[22] Filed: Mar. 20, 1981

[51] Int. Cl.³ .............................................. B65G 7/12
[52] U.S. Cl. ..................................... 294/26; 294/169
[58] Field of Search ...................... 294/1 R, 2, 5.5, 15, 294/17, 26, 50.6, 51, 53.5, 78 R, 81 R, 82 R, 85, 137, 141, 142, 167, 169; 7/167, 168; 16/110 R, 122–127; 248/339–341; 403/3

[56] References Cited

U.S. PATENT DOCUMENTS

| | | | |
|---|---|---|---|
| 139,029 | 5/1873 | Smith | 294/26 |
| 1,197,241 | 9/1916 | Spencer | 294/17 |
| 1,390,185 | 9/1921 | Wold | 294/17 |
| 1,465,510 | 8/1923 | Cote | 294/26 |
| 1,470,284 | 10/1923 | Pooler | 294/50.6 |
| 1,506,694 | 8/1924 | Toffey | 16/126 |
| 2,132,553 | 10/1938 | Andrejchak | 294/17 |
| 2,211,062 | 8/1940 | King | 294/17 |
| 2,229,334 | 1/1941 | Matz | 294/17 |
| 2,506,349 | 5/1950 | Day | 294/26 |
| 2,539,231 | 1/1951 | Davis | 294/17 X |
| 2,693,935 | 11/1954 | Halbert | 294/17 X |
| 3,310,331 | 3/1967 | Michaud | 294/26 |
| 4,120,189 | 10/1978 | Jones | 294/82 R X |
| 4,326,744 | 4/1982 | Long | 294/82 R X |

FOREIGN PATENT DOCUMENTS 152608 12/1955 Sweden ................................. 294/26

Primary Examiner—Johnny D. Cherry
Attorney, Agent, or Firm—Parmelee, Johnson, Bollinger & Bramblett

[57] ABSTRACT

The present invention provides a compact, multi-purpose log handling tool including a log handling hook with an integrally extending shank having an opening defined in its upper end. A loop shaped handle is received through the opening in the shank for mounting the hook to the handle. In the preferred embodiment of the invention, the opening in the shank is generally flat-sided (rectangular, square or oval), and the handle has at least two sections of different cross-sectional area. The shank, and thus also the hook, is slideable between the two sections. The first handle section has a generally circular cross-sectional area and is of smaller dimension than the opening in the shank, and the second handle section has a cross-sectional area and dimension that identically compliments the size and shape of the opening in the shank. When the shank is slid into engagement over the first section of the handle, the hook is pivotal relative to the handle. However, when the shank is slid into engagement over the second section of the handle, the hook is maintained in a rigid extended position relative to the handle as a result of the complimentary fit between the shape of the second section and the opening in the shank. Accordingly, the present tool provides a rigid hook, as for example, when the tool is to be used as a pulp-hook, or a pivotal hook, as for example, when the tool is used as a ring dog to roll logs. Additionally, when the shank is in engagement over the first section of the handle, the hook can be folded across the handle in a compact storage or carrying position.

16 Claims, 7 Drawing Figures

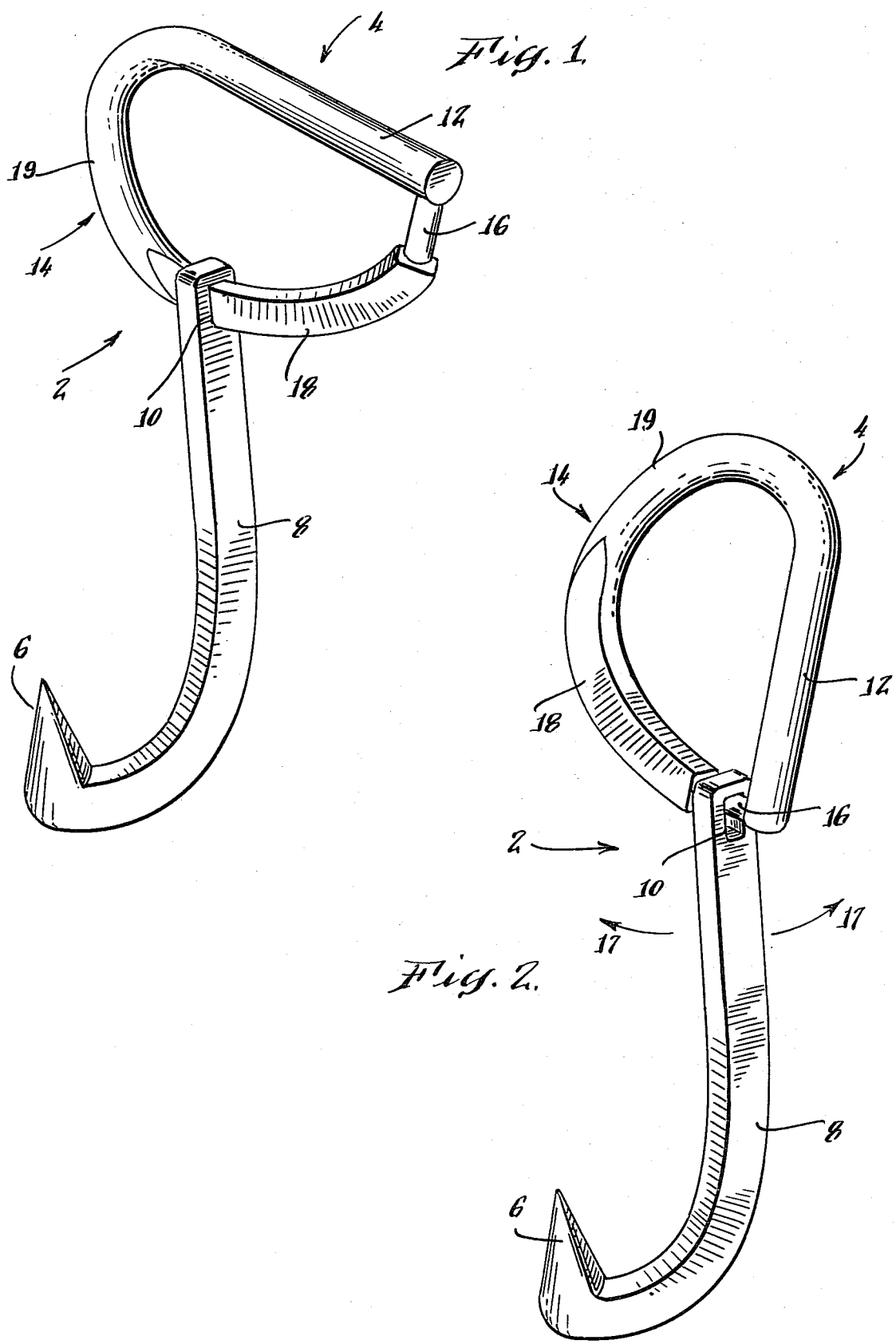

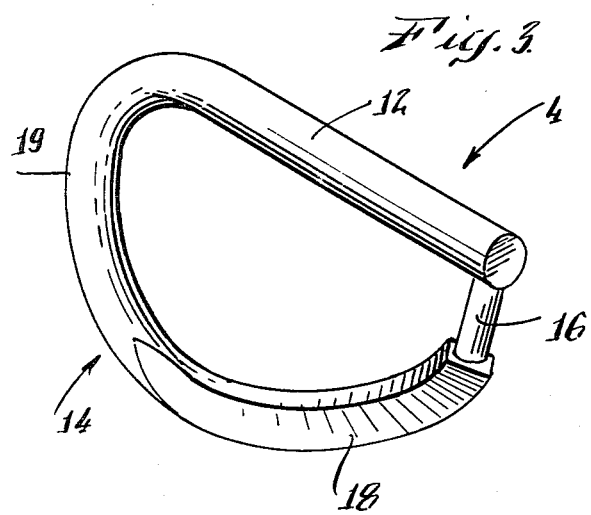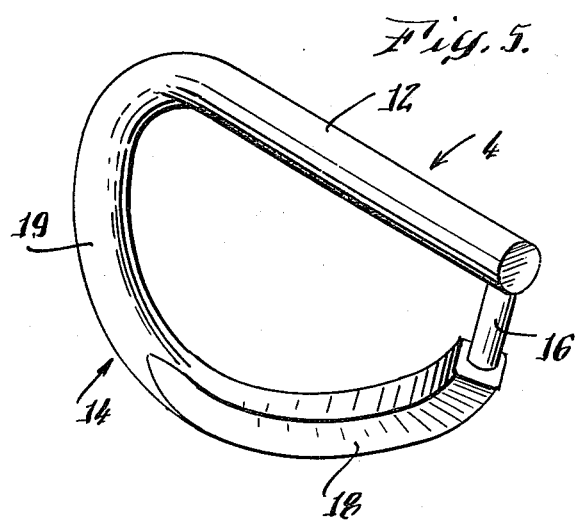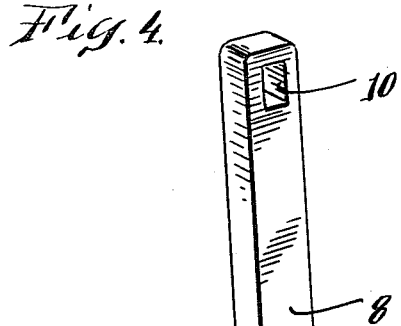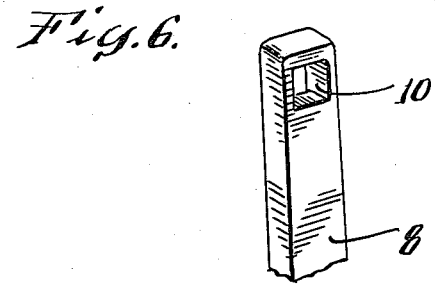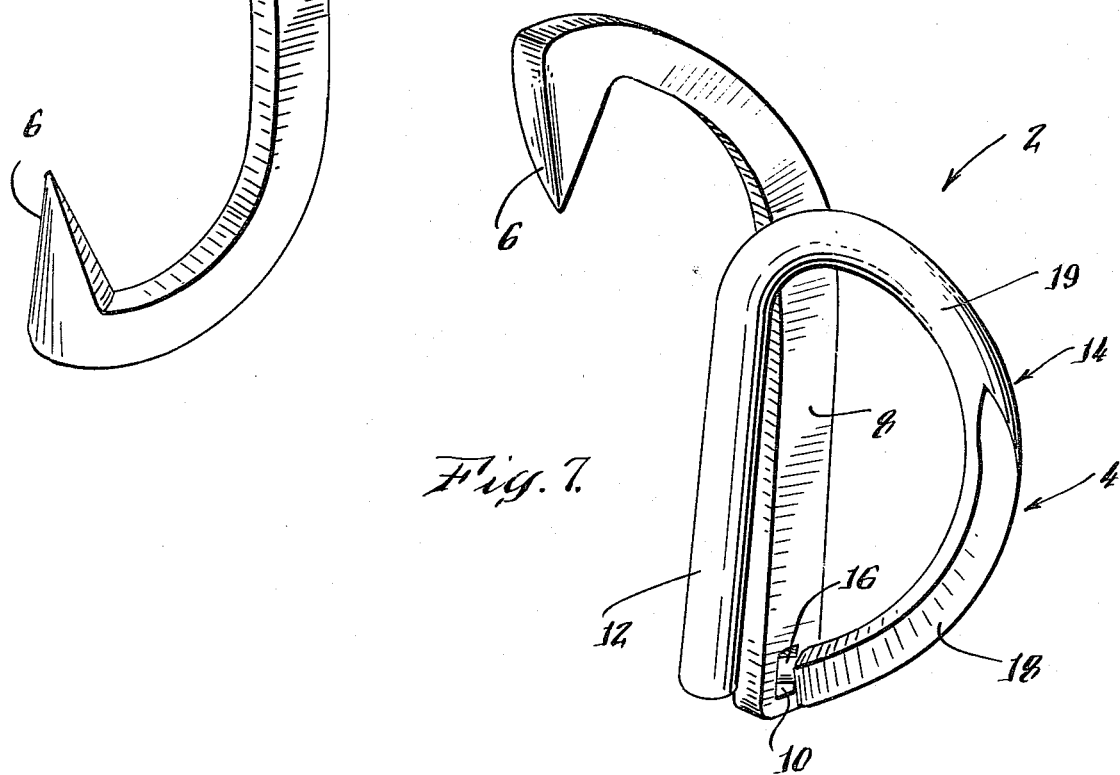

MULTI-PURPOSE LOG HANDLING TOOL

BACKGROUND OF THE INVENTION

The present invention relates to a wood handling tool and in particular to a multi-purpose tool which is functionally equivalent to a peavy, a cant hook, a ring dog, and a pulp hook. The aforementioned tools are generally known in the wood handling art, and for the most part are large or bulky and thus difficult to handle or carry.

By way of background, a typical peavy is a log handling tool having a long extended handle. A steel pike extends from the front end of the handle and a steel collar is mounted to the handle behind the steel pike. A steel hook is pivotally mounted to the steel collar. A good illustration of typical peavy is found in the U.S. Pat. No. 2,211,062.

A cant hook is similar to the above described peavy except that it does not include a steel pike extending from the front end of the handle. However, like the peavy, the cant hook includes a long, extended wooden handle. Illustrations of typical cant hooks are found in the U.S. Pat. Nos. 2,132,533; 2,229,334; 2,539,231; and 1,390,185.

Other known log handling tools, such as pulp hooks, are illustrated in U.S. Pat. Nos. 1,197,241; 3,310,331; 1,465,510; and 2,693,935.

A ring dog is another known wood handling tool. The ring dog includes a hook having a shank portion with an opening defined therein and a circular shaped handle extending through the opening on the shank. The hook is pivotal relative to the handle, and the ring dog is used for rolling logs.

It becomes evident from a review of the known log handling tools that, for the most part, they are large, bulky, and difficult to handle, as for example, the peavy and the cant hook. Furthermore, each of these tools serves only a single function. That is, the pulp hook is used to lift or carry logs, while a tool such as a ring dog, peavy or cant hook is used only to roll logs.

It is the object of the present invention to provide a multi-purpose log handling tool which is useful for both lifting and rolling logs, is compact and easy to handle, and can be folded into a convenient carrying position so that, for example, it may be worn on the belt of a lumberman.

SUMMARY OF THE INVENTION

The present invention provides a compact, multi-purpose tool for handling logs having a hook with an integrally extending shank mounted to a handle. The handle is of a generally closed loop configuration and is received through an opening in the shank of the hook. The handle includes at least a first section having a generally circular cross-sectional area which is of smaller dimension than the opening in the shank of the hook, and a second section having a cross-sectional area which identically compliments the cross-sectional area and shape of the opening in the shank. In the preferred embodiments of the invention, the opening in the shank is flat-sided, as for example, a generally rectangular configuration.

The hook is selectively slideable between the first and second sections of the handle by sliding the handle through the opening in the shank. When the shank is slid over the first section of the handle, the hook is pivotal relative to the handle. However, when the shank is slid onto the second section of the handle, the shank and the hook are maintained in an extended rigid position relative to the handle because of the complimentary fit between the opening in the shank and the second section of the handle. A third section of the handle having a larger cross-sectional area than the opening in the shank may be provided adjacent the second section of the handle to act as a stop to limit the range of sliding movement of the shank and hook on the handle.

Thus, the log handling tool of the present invention selectively functions as a log lifting tool (e.g., a pulp hook) when the shank is engaged on the second section of the handle and thus rigid therewith, and also functions as a log rolling tool (e.g., a peavy, cant hook or ring dog) when the shank of the hook is engaged on the first section of the handle and thus pivotal therewith. When the shank is engaged on the first section of the handle, the hook and shank may be folded over the handle so that the tool can be stored or carried in a compact folded position.

BRIEF DESCRIPTION OF THE DRAWINGS

FIG. 1 is a perspective view of one embodiment of the tool of the present invention, showing a generally "D" shaped handle having a hook mounted thereto through an opening in the shank portion of the hook. The hook rigidly extends from the handle.

FIG. 2 is a perspective view of the tool of FIG. 1 in which the hook is pivotally mounted to the handle.

FIG. 3 is a perspective view of the handle of the tool of FIGS. 1 and 2 separated from the hook.

FIG. 4 is a perspective view of the hook of the tool of FIGS. 1 and 2 separated from the handle.

FIG. 5 is a perspective view of the handle of another embodiment of the tool in accordance with the present invention.

FIG. 6 is a perspective view of the shank of a hook to be used with the handle illustrated in FIG. 5.

FIG. 7 is a perspective view of the FIGS. 1 and 2 embodiment of the invention with the hook folded over the handle in a compact carrying position.

DESCRIPTION OF THE PREFERRED EMBODIMENT OF THE INVENTION

The present invention provides a simple, compact, multi-purpose log-handling tool as illustrated in FIGS. 1-7 of the drawings.

FIGS. 1-4 disclose a log-handling tool in accordance with the present invention generally indicated by the reference numeral 2. The tool includes a "D" shaped handle shown by the reference numeral 4, and a hook shown by the reference numeral 6. The hook includes an integrally extending shank 8, and an opening 10 is defined near the top of the shank. The hook is mounted to the handle by receiving the handle through the opening in the shank. In the preferred embodiment of the invention, both the handle and the hook are formed from steel.

As more clearly seen in FIG. 3, the "D" shaped handle 4 has a straight portion 12 and an arcuate portion 14 joining the ends of the straight portion. The arcuate portion 14 includes a first section 16 having a generally round cross-sectional configuration, and a second section 18 which is flat-sided and has a generally oval or rectangular cross-sectional configuration. A third section 19 is of a generally round cross-section, but is of a greater diameter than the first section 16 and of larger cross-sectional area than the opening 10 in the shank of the hook.

Referring now to FIG. 4, opening 10 defined in the upper portion of the shank 8 of the hook 6 has a cross-sectional shape and dimension which identically compliments the cross-sectional configuration of the flat-sided section 18 of the handle. To the contrary, the circular cross-sectional area of section 16 of the handle is of smaller dimension than the opening 10 on the shank of the hook 6. The shank 8 is slideable between the round section 16 of the handle and the flat-sided section 18 of the handle by sliding the opening 10 across the two handle sections. However, the shank cannot slide onto the third section 19 because the cross-section of section 19 is greater than the size of the opening 10. Thus, section 19 limits the range of movement of the shank and hook on the arcuate portion 14 of the handle.

It becomes apparent from the above description, that the log-handling tool 2 provides a hook which is either pivotal relative to the handle, or is rigidly extended relative to the handle, at the selection of the user. That is, if the hook is slid so that the opening 10 on the shank is in engagement with section 16 of the handle, the hook (and its shank) will be pivotal relative to the handle as a result of the smaller circular cross-sectional area of section 16 of the handle, as illustrated by FIG. 2. Arrows 17 illustrate the pivotal movement. However, if the hook is moved into a position in which the opening 10 on the shank is in engagement with the flat-sided section 18 of the handle, the hook will be maintained in an extended rigid position relative to the handle, as illustrated by FIG. 1. The rigidity occurs because the rectangular cross-sectional dimension of the opening 10 on the shank compliments exactly the configuration and the dimension of section 18 of the handle. As such, it is not possible for the hook to pivot relative to the handle, and the handle is maintained in rigid extended position.

Accordingly, when the hook is slid into position on the handle in which the hook is pivotal therewith, as in FIG. 2, the tool performs the function of a ring dog, as discussed previously, and can be used for rolling logs. However, when the hook is slid into its position on the handle in which it is rigidly extending therefrom, as in FIG. 1, the tool can be used to perform the functions of a pulp hook, as discussed previously, to lift or carry logs. In the event that additional leverage is required to either roll, lift, or move logs, a strong piece of wood can be inserted through the open center of the handle to act as a lever. Because scraps of wood are readily available in the wooded areas in which the present tool will be used, it is unnecessary for the woodsmen to carry a large or bulky-handle with him. Accordingly, not only does the present tool perform multi-functions, but it is compact and easy to carry.

Turning now to FIG. 7 of the drawings, a further advantage of the present embodiment of the invention is disclosed. In that figure, the hook 6 is shown folded over the "D" shaped handle 4 in a compact carrying or storage position. As discussed above, the hook 6 is pivotal relative to the handle 4 when the opening 10 in the shank 8 is in engagement on the round section 16 of the handle. When the tool is in use, this position of the hook is helpful for log rolling, as discussed above. However, when the tool is not being used, the hook and its shank can be folded across the "D" shaped handle in a further compacted position so that the tool itself may be readily stored or carried by the woodsmen. In fact, in this folded position, the tool itself can be suspended directly from the woodsmens' belt by passing the belt through the handle.

FIGS. 5 and 6 of the drawings illustrate a second embodiment of the multi-purpose tool in accordance with the present invention. FIG. 6 only shows the shank of the hook, not the entire hook. Because the FIGS. 5 and 6 embodiment is similar to the FIGS. 3 and 4 embodiment, the same reference numbers have been used to designate corresponding elements. The difference between this second embodiment and the first embodiment described above is that in the present embodiment, the flat-sided second section of the handle is now generally square-shaped and the opening at the top of the shank of the hook is also square-shaped to correspond identically with the cross-sectional configuration and dimensions of the second section of the handle. The operation of the tool embodied in the FIGS. 5 and 6 embodiment is identical to that described with respect to the first embodiment. This second embodiment has been disclosed to illustrate that it is not necessary for the cross-section of the second section 18 of handle 4 and the opening 10 in the shank of the hook to be either rectangular or oval shaped, but other configurations will also provide the same advantageous results.

Although the handle 6 of the preferred embodiment of the invention is illustrated as "D" shaped, other configurations may be used, provided that the handle includes at least one section of smaller cross-sectional area than the opening in the hook and at least one section having a cross-sectional area corresponding to the opening in the hook. However, the "D" shaped handle is desirable in the preferred embodiment of the invention, because it can be easily gripped by the user and because the "D" shaped configuration tends to more easily receive the hook 6 and its shank 8 when the hook is folded over on the handle in its storage position as shown in FIG. 7.

It is believed that other modifications of the embodiments described herein will become apparent to those of skill in the art. However, the above discussion has been intended to be illustrative only, and not restrictive of the scope of the invention, that scope being defined by the following claims and all equivalents thereto.

I claim:

1. A multi-purpose tool for handling logs, said tool including:
    a hook having an opening defined at one end thereof, said hook being configured for gripping a portion of a log,
    a handle received through said opening in said hook for mounting said hook to said handle,
    said handle including a first section of smaller cross-sectional dimension than said opening in said hook so that said handle is pivotal relative to said hook when said opening is positioned on said first section of said handle,
    said handle including a second section having a cross-sectional area substantially complementing the cross-sectional area of said opening in said hook, the shape of said cross-section of said opening and said second section being such that said handle is maintained in an extended position relative to said hook and not pivotal therewith when said opening is positioned on said second section of said handle,
    said hook and said handle being slideably movable relative to each other through said opening in said hook so that said hook is selectively movable between said first and second sections of said handle.

2. The tool as claimed in claim 1 further including means on said handle for limiting the range of slideable movement of said hook along said handle.

3. The tool as claimed in claim 2 wherein said means includes a third section defined on said handle adjacent said second section, said third section having a cross-sectional area of greater dimensions than said opening in said hook for preventing slideable movement of said hook from said second to said third section of said handle.

4. A multi-purpose tool for handling, lifting and moving logs, lumber and the like, said tool including:
 a hook having an integrally extending shank, said shank having a generally rectangular opening defined therein,
 a generally "D" shaped handle received through said opening in said shank for mounting said hook to said handle,
 said handle including a first section having a generally circular cross-sectional area and a second section having a generally rectangular cross-sectional area, said first and second sections being defined on the arcuate portion of said "D" shaped handle,
 said circular cross-sectional area of said first section being of smaller dimension than said opening in said shank so that said hook is pivotal relative to said handle when said shank is engaged on said first section,
 said rectangular cross-sectional area of said second section being substantially the same shape and dimension as said rectangular opening in said shank so that said hook is maintained in an extended position relative to said handle and not pivotal therewith when said shank is engaged on said second section of said handle,
 said shank being slideable relative to said handle through said opening in said shank for selective movement of said hook between said first and said second sections of said handle.

5. The tool as claimed in claim 4 wherein said "D" shaped handle is sufficiently large to removably receive a shaft therethrough.

6. A multi-purpose tool for handling logs, said tool including:
 a hook having an opening defined at one end thereof, said hook being configured for gripping a portion of a log,
 a handle received through said opening in said hook for mounting said hook to said handle,
 said handle being generally configured in the shape of a closed loop,
 said handle including a first section of smaller cross-sectional dimension than said opening in said hook so that said handle is pivotal relative to said hook when said opening is positioned on said first section of said handle,
 said handle including a second section having a cross-sectional area substantially complementing the cross-sectional area of said opening in said hook, the shape of said cross-section of said opening and said second section being such that said handle is maintained in an extended position relative to said hook and not pivotal therewith when said opening is positioned on said second section of said handle,
 said hook and said handle being slideably movable relative to each other through said opening in said hook so that said hook is selectively movable between said first and second sections of said handle.

7. A tool as claimed in claim 6 wherein the cross-sectional area of said first section of said handle is round.

8. A tool as claimed in claim 6 wherein the cross-sectional area of said second section of said handle and said opening is generally square.

9. A tool as claimed in claim 6 wherein the cross-sectional area of said second section of said handle and said opening is generally rectangular.

10. A tool as claimed in claim 6 wherein said hook includes a shank integrally extending from one end thereof, and said opening is defined in the upper portion of said shank.

11. A tool as claimed in claim 6 wherein said generally loop-shaped handle is sufficiently large so that a shaft can be removably inserted therethrough to act as a lever.

12. A multi-purpose tool for handling logs, said tool including:
 a hook having an opening defined at one end thereof, said hook being configured for gripping a portion of a log,
 a handle received through said opening in said hook for mounting said hook to said handle,
 said handle including a first section of smaller cross-sectional dimension than said opening in said hook so that said handle is pivotal relative to said hook when said opening is positioned on said first section of said handle,
 said handle including a second section having a cross-sectional area substantially complementing the cross-sectional area of said opening in said hook, the shape of said cross-section of said opening and said second section being such that said handle is maintained in an extended position relative to said hook and not pivotal therewith when said opening is positioned on said second section of said handle,
 said handle being "D" shaped and said first and second sections of said handle being positioned on the arcuate portion of said "D",
 said hook and said handle being slideably movable relative to each other through said opening in said hook so that said hook is selectively movable between said first and second sections of said handle.

13. A tool as claimed in claim 12 wherein said first section of said handle is positioned on said arcuate portion of said "D" adjacent to the straight portion of said "D".

14. A tool as claimed in claim 13 wherein said hook is foldable into a compact storage position across the length of said "D" shaped handle when said hook is in engagement on said first section of said handle.

15. The tool as claimed in claim 4, 6 or 12 further including means on said handle for limiting the range of slideable movement of said hook along said handle.

16. The tool as claimed in claim 15 wherein said means includes a third section defined on said handle adjacent said second section, said third section having a cross-sectional area of greater dimensions than said opening in said hook for preventing slideable movement of said hook from said second to said third section of said handle.

* * * * *